(12) United States Patent
Honorato Ruiz et al.

(10) Patent No.: US 8,006,932 B2
(45) Date of Patent: Aug. 30, 2011

(54) PIVOTING COUPLING SYSTEM FOR A LARGE DIHEDRAL EMPENNAGE TO THE TAIL FUSELAGE OF AN AIRCRAFT

(75) Inventors: Francisco Javier Honorato Ruiz, Madrid (ES); Angel García Sacristán, Madrid (ES)

(73) Assignee: Airbus Operations, S.L., Getafe (Madrid) (ES)

( * ) Notice: Subject to any disclaimer, the term of this patent is extended or adjusted under 35 U.S.C. 154(b) by 898 days.

(21) Appl. No.: 11/711,758

(22) Filed: Feb. 28, 2007

(65) Prior Publication Data
US 2007/0267541 A1 Nov. 22, 2007

(30) Foreign Application Priority Data
Feb. 28, 2006 (ES) .................... 200600562

(51) Int. Cl.
*B64C 9/00* (2006.01)
(52) U.S. Cl. ........... 244/87; 244/88; 244/99.2; 244/99.3
(58) Field of Classification Search ............. 244/87, 244/88, 99.2, 99.3, 119, 129.1
See application file for complete search history.

(56) References Cited

U.S. PATENT DOCUMENTS

| | | | | |
|---|---|---|---|---|
| 1,859,306 A | * | 5/1932 | Loening | 244/87 |
| 2,097,990 A | * | 11/1937 | Sikorsky | 244/87 |
| 2,580,176 A | * | 12/1951 | Johnson | 244/87 |
| 3,055,620 A | * | 9/1962 | Weiland | 244/135 A |
| 3,756,529 A | * | 9/1973 | Backlund et al. | 244/87 |
| 4,034,939 A | * | 7/1977 | Ridley, Jr. et al. | 244/87 |
| 5,096,142 A | * | 3/1992 | Rodriguez | 244/87 |
| 6,273,363 B1 | | 8/2001 | Sprenger | |

FOREIGN PATENT DOCUMENTS

| | | |
|---|---|---|
| EP | 1 413 782 | 4/2004 |
| GB | 1 317 187 | 5/1973 |

OTHER PUBLICATIONS

Richardson, D. et al. *The Great Book of Modern Warplanes.* New York: Salamander Books, 1987. pp. 538-541. ISBN 0-517-63367-1.

\* cited by examiner

*Primary Examiner* — Tien Dinh
*Assistant Examiner* — Philip J Bonzell
(74) *Attorney, Agent, or Firm* — Wenderoth, Lind & Ponack, L.L.P.

(57) ABSTRACT

A pivoting coupling system of a large dihedral empennage to the tail fuselage of an aircraft, in which the empennage includes a right lateral box and a left lateral box arranged at a large dihedral angle in the tail fuselage of the aircraft. The pivoting coupling system including a horizontal central box joining the lateral boxes, and which includes a rear spar; and a linkage for horizontally linking the central box to a frame structure of the tail fuselage of the aircraft, which allow the empennage to rotate vertically about a horizontal linkage shaft between a negative maximum angle of incidence and a positive maximum angle of incidence in response to the actuation of an actuator which is connected to the empennage and to a structural element of the fuselage of the aircraft.

17 Claims, 16 Drawing Sheets

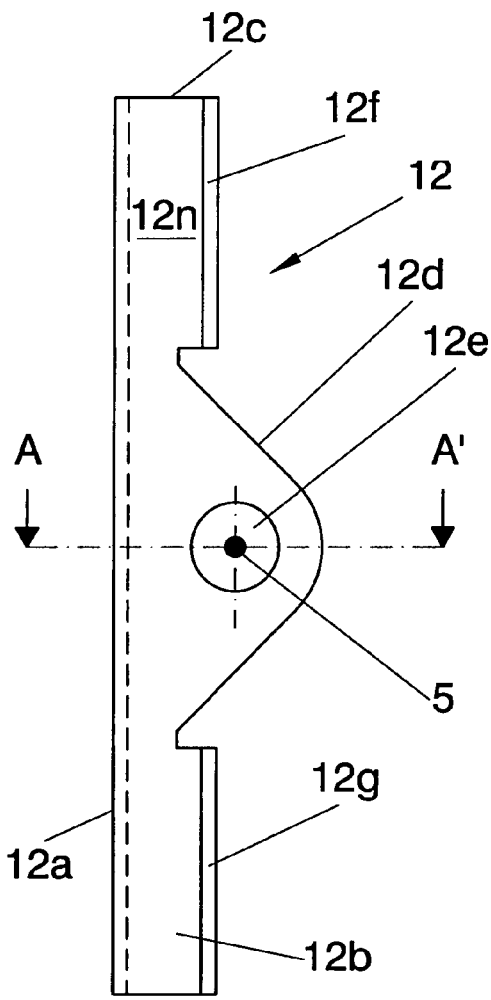
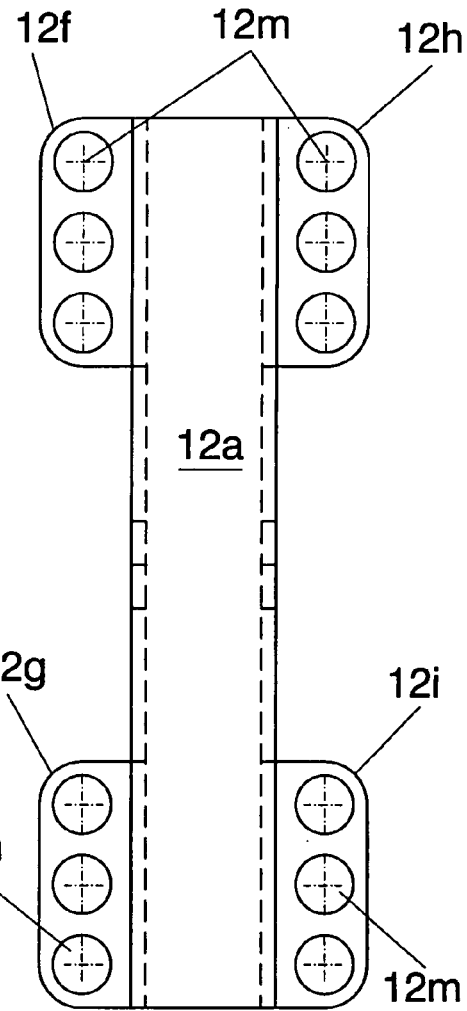
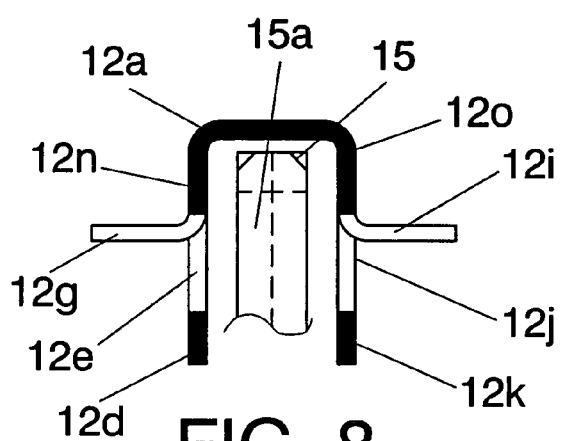
FIG. 6
FIG. 7
FIG. 8
(A-A')

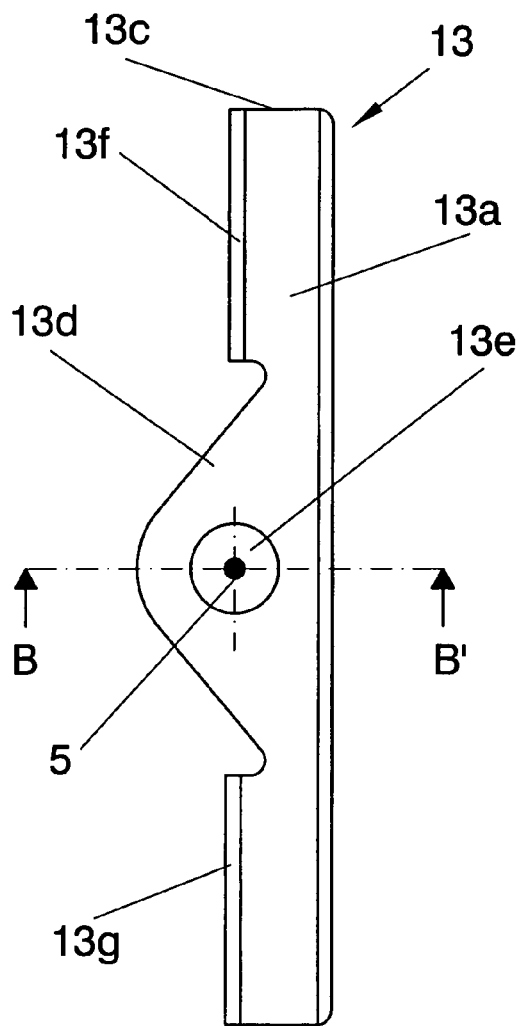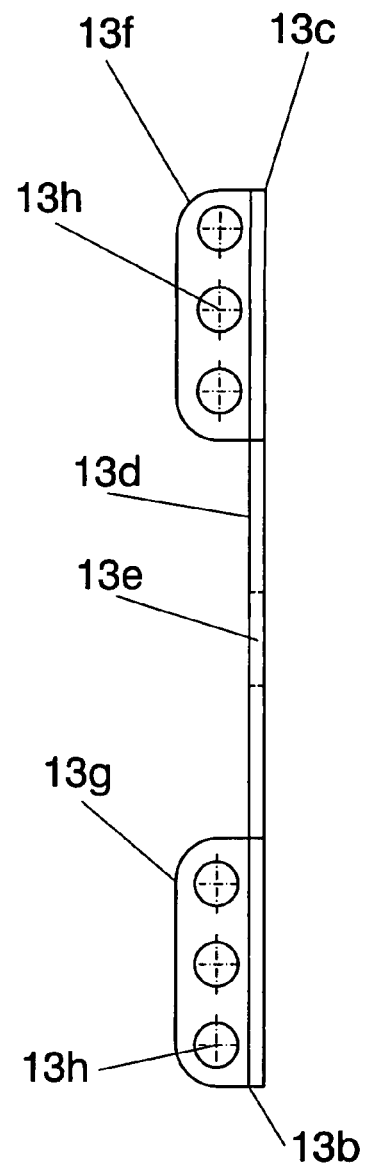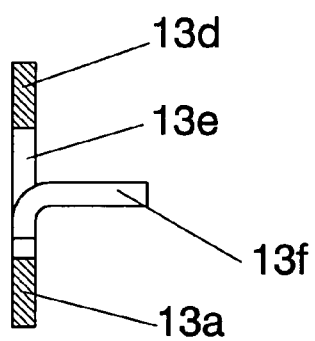
FIG. 9
FIG. 10
FIG. 11
(B-B')

(C-C')

(D-D')

(E-E')

(F-F')

(G-G')

PIVOTING COUPLING SYSTEM FOR A LARGE DIHEDRAL EMPENNAGE TO THE TAIL FUSELAGE OF AN AIRCRAFT

BACKGROUND OF THE INVENTION

1. Technical Field of the Invention

This invention belongs to the field of aeronautics and particularly to the sector of couplings between V-shaped tails, also known as large dihedral empennages, and structural elements of the fuselage of aircraft.

2. Description of Related Art

Large dihedral empennages have for decades been known in combat aircraft such as the F-117A Nighthawk, and in light aircraft such as the Beech D35 Bonanza, for example. Nevertheless, in large passenger transport aircraft, this type of empennage has not been used, due in part to the fact that it behaves differently from empennages with separate horizontal and vertical stabilisers, since the loads which this type of tail imply for the structure of the fuselage displayed difficulties when it came to designing a coupling that was reliable, safe and of acceptable weight.

SUMMARY OF THE INVENTION

The object of the present invention is to overcome the difficulties mentioned above by means of a pivoting coupling system for a large dihedral empennage to the tail fuselage of an aircraft, in which the empennage comprises a right lateral box and a left lateral box arranged at a large dihedral angle in the tail fuselage of the aircraft, the system comprising a horizontal central box joining the lateral boxes and which comprises a rear spar; and means of linkage for horizontally linking the central box to a frame structure of the tail fuselage of the aircraft, which allow the empennage to rotate vertically about a horizontal linkage shaft between a negative maximum angle of incidence $-\theta_1$ (corresponding to a position in an ascent maneuver of the aircraft) and a positive maximum angle of incidence $+\theta_2$ (corresponding to a position in a descent maneuver of the aircraft) in response to the actuation of actuator means which are connected to the empennage and to a structural element of the fuselage of the aircraft.

This arrangement of elements permits the efficient coupling of the large dihedral empennage which acts as the elevator in the tail fuselage of the aircraft.

In an embodiment of the invention, the frame structure includes a closed frame and the means of linkage include a first linked fitting provided in the proximity of the right box. In this embodiment, the first linked fitting comprises a first rotary fitting provided in the frame structure and linked by means of a first bolt to a complementary first rotary fitting provided in the rear spar of the empennage. The second linked fitting is provided in the proximity of said left box and comprises a second rotary fitting provided in the frame structure and linked by means of a second bolt to a complementary second rotary fitting provided in the rear spar of the empennage. Each of the complementary rotary fittings in turn includes at least one complementary opening aligned with at least one opening in one of the rotary fittings and a complementary opening in at least one of the complementary rotary fittings, in order to form a space in which the bolt is housed. At least one lateral load linked fitting is in turn provided in this embodiment in order to prevent lateral displacements of the empennage, which is provided in the central box between the linked fittings and which comprises a lateral load fitting provided in the frame structure linked to at least one complementary lateral load fitting which is provided in the rear spar of the empennage. These lateral load fittings are linked together such that they permit the empennage to rotate on the said horizontal shaft.

The closed frame structure preferably comprises an upper section, a central section and a lower section, the means of linkage being provided in the central section of the closed frame.

In accordance with the invention, each of the rotary fittings can include a first fitting element with at least one lower anchoring point and at least one upper anchoring point and at least two lugs between the anchoring points. Each lug has an opening for the bolt to pass through.

In a preferred embodiment of the invention, each rotary fitting comprises a central fitting element in the form of an elongated body with two ends and arranged in a first side of the closed frame, along with a first counter-fitting element and a second counter-fitting element arranged on the opposite side of the closed frame. In this embodiment, the central fitting element comprises a first lateral wall with a free edge from which emerge a first lug with a first opening, a first lateral wing arranged between the first end of the central fitting element and the first lug, and a second lateral wing arranged between the second end of the central fitting element and the first lug. The second lateral wall also has a free edge from which emerges a second lug with a second opening, a third lateral wing arranged between the first end of the central fitting element and the second lug, and a fourth lateral wing arranged between the second end of the central fitting element and the second lug. The lateral walls are joined by a central wall. Each of the lugs is coplanar with the lateral wall from which it emerges. The lateral wings in turn extend the respective lateral walls in the opposite direction to the central wall. The first counter-fitting element comprises a first plate (13a) with a first end and a second end between which an edge is defined from which extend a third lug with a third opening coplanar with the first plate, a fifth lateral wing laterally emerging from said edge between said first end and the third lug, and a sixth lateral wing laterally emerging from said edge between said second end and the third lug. The second counter-fitting element has a configuration which is the mirror image of the first counter-fitting element, and comprises a second plate with a first end and a second end, between which an edge is defined from which extend a fourth lug with a fourth opening coplanar with the second plate with a fourth opening, a seventh lateral wing laterally emerging from the edge between the first end and the fourth lug, and an eighth lateral wing laterally emerging from the edge between the second end of the second plate and the fourth lug. The lugs of each counter-fitting element extend via individual cut-outs provided in the closed frame.

This configuration of the fitting elements allows the lateral wings of the central fitting element and the lateral wings of the counter-fitting elements to be arranged in positions so that they are respectively facing each other and separated by a distance corresponding to the thickness of the frame, in such a way that the first lug of the central fitting element makes contact with at least the outer surface of the third lug of the first counter-fitting element, and the second lug of the central fitting element makes contact with at least the outer surface of the fourth lug of the second counter-fitting element, in such a way that the openings are aligned with each other and with the opening for housing the bolt. The first lug can also make contact with the surface of the first plate and the second lug can also make contact with the surface of the second plate. In turn, the third lug can also make contact with the outer surface of the first lateral wall and the fourth lug can also make contact with the outer surface of the second lateral wall. Moreover, the first lug can be joined to at least the outer surface of the third lug and the second lug can be joined to at least the outer surface of the fourth lug.

In accordance with the invention, the central fitting element and the counter-fitting elements can be manufactured from carbon fibre reinforced resin, which advantageously contributes to reducing the weight of the coupling system of the present invention.

In accordance with the invention, the closed frame can furthermore comprise an additional cut-out via which emerges at least part of the lateral load fitting and/or the complementary lateral load fitting which, in this case, are coupled to each other by means of a swivel joint.

The swivel coupling can be materialised by means of an embodiment in which each lateral load fitting comprises a forward fitting and a rear fitting. In this case, the forward fitting comprises a first part fixed to a first side of the closed frame and a first free lug with a first passage hole, while the rear fitting comprises a first part fixed to a second side of the closed frame opposite to said first side and a second free lug with a second passage hole.

The first free lug of the forward fitting and the second free lug forming part of the rear fitting are in contact with each other and emerge via said additional cut-out in such a way that said passage holes are aligned with each other.

Moreover, in this embodiment, the complementary lateral load fitting comprises a plate joined to the rear spar of the central box of the empennage, as well as at least two wings emerging orthogonally from the plate, separated from each other and provided with vertically aligned mouths.

These mouths are aligned with the passage holes of the lateral load fitting when the lugs of the lateral load fitting are positioned between the wings, the mouths and the passage holes, in such a way that a vertical space is formed for housing a pin by means of which the lateral load fitting is linked to the complementary lateral load fitting. In order to allow the lateral load linked fitting not to interfere with the rotation of the empennage, provision is made so that the distance between the wings is greater than the thickness of the free lugs of the lateral load fitting and that the passage holes have, at least in the axial direction, extensions greater than the diameter of the pin, in such a way that the lateral load fittings can operate as a swivel. For this, the distance between the wings, the extensions of the passage holes and the dimensions of the free lugs can be designed such that the wings and the free lugs do not make contact when the empennage rotates between the negative maximum angle of incidence ($-\theta_1$) and the positive maximum angle of incidence ($+\theta_2$) and that they remain positioned in parallel planes for a mean angle of incidence corresponding to half the angle of rotation between said negative maximum angle of incidence ($-\theta_1$) and said positive maximum angle of incidence ($+\theta_2$).

The lateral load fitting and/or the complementary lateral load fitting are normally metallic though they could also be manufactured from carbon fibre reinforced resin.

Via the rotary linked fittings, the vertical component of the aerodynamic and inertial loads that are produced in the empennage is transmitted to the fuselage, while by means of the lateral load linked fitting or fittings the horizontal component, in other words, the lateral load, of the loads produced on the empennage is transmitted, also to the fuselage.

In this way, and especially when the rotary fittings and the lateral load linked fitting or fittings are coupled to the central section of a closed frame especially enabled to withstand the loads of the empennage, a transmission of the loads to the fuselage is achieved and, therefore, a distribution of those loads which contributes to an efficient coupling of the large dihedral empennage to the tail fuselage of the aircraft, by means of an arrangement of elements of great simplicity which are in turn easy to fit and maintain.

BRIEF DESCRIPTION OF THE FIGURES

Described below are certain aspects and embodiments of the invention on the basis of some figures in which

FIG. 6 is a lateral schematic view of a central rotary fitting element applicable in the system of the present invention;

FIG. 7 is an upper plan view of the central rotary fitting element shown in FIG. 6;

FIG. 8 is a schematic view in cross-section (rotated 90° in the clockwise direction) of the rotary fitting element shown in FIG. 6 seen from the line A-A' appearing in that figure;

FIG. 9 is a schematic view in lateral elevation of an embodiment of the first lateral counter-fitting element used together with the central rotary fitting element shown in FIGS. 5 to 8;

FIG. 10 is a schematic view in upper plan of the counter-fitting element shown in FIG. 9;

FIG. 11 is a schematic view in cross-section along the line B-B' (rotated 90° in the clockwise direction) appearing in FIG. 9;

DETAILED DESCRIPTION OF THE INVENTION

Figure 1:
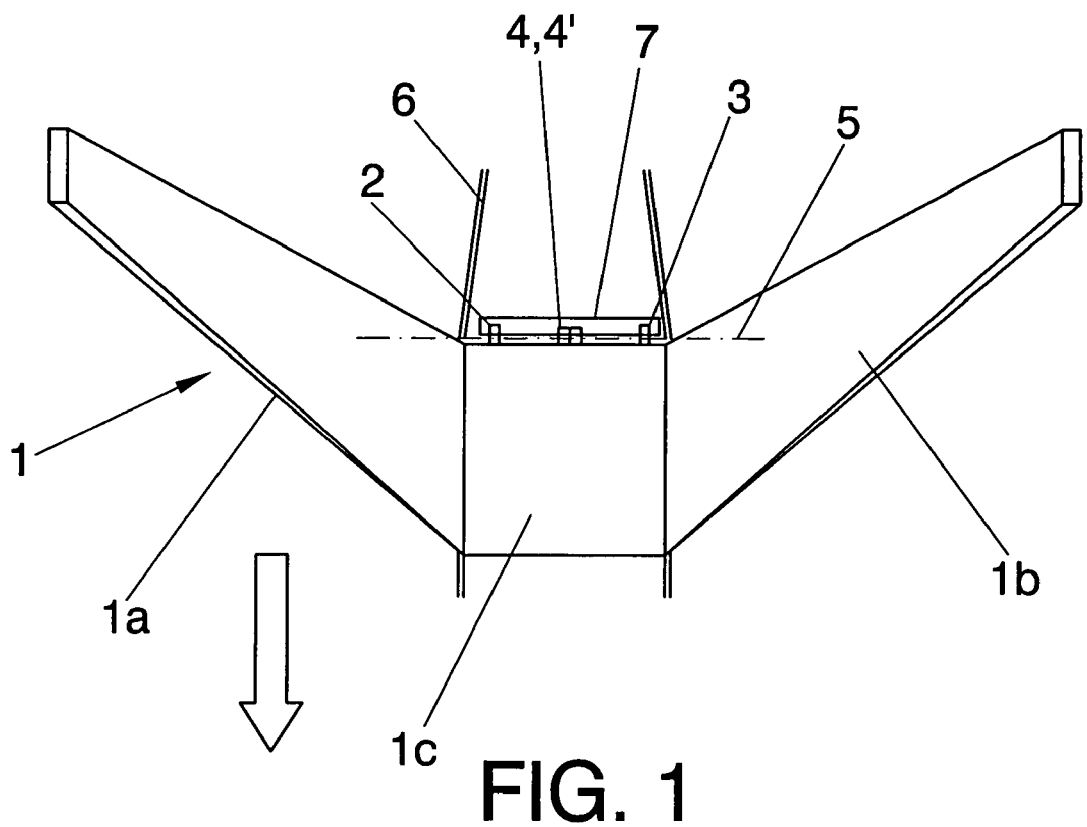
FIG. 1 is a schematic view in upper plan of the arrangement of an empennage linked to the tail fuselage of an aircraft according to an embodiment of the present inventive system where the arrow indicates the direction of flight of the aircraft.
Figure 2:
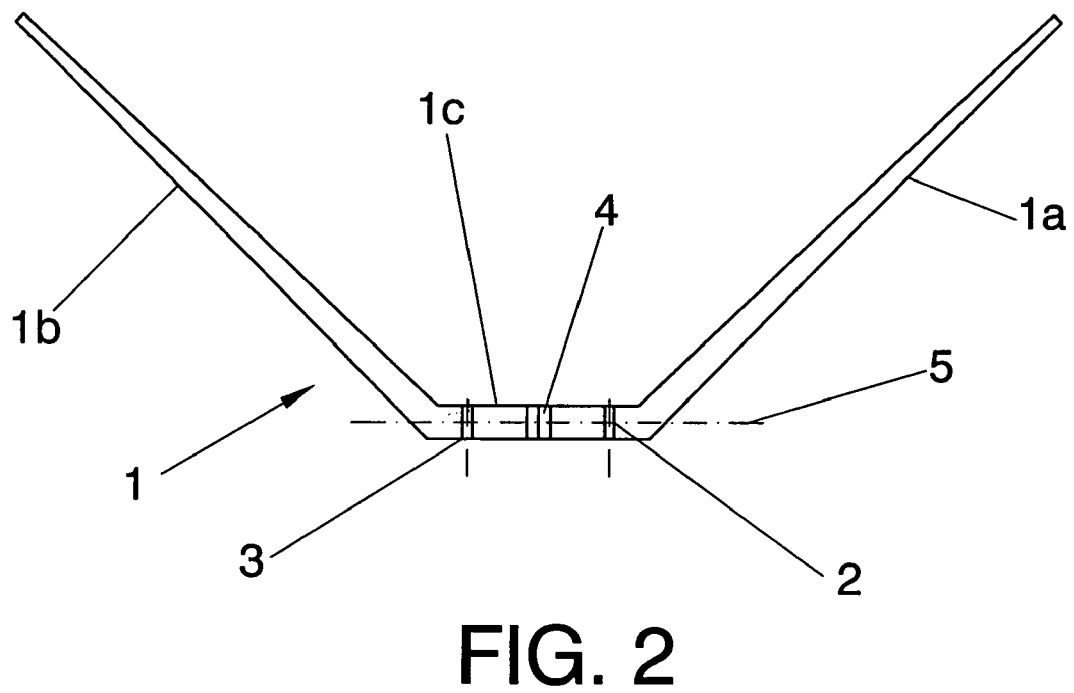
FIG. 2 is a rear schematic view of the arrangement of boxes of the tail fuselage to which the present invention is applied.
Figure 3A:
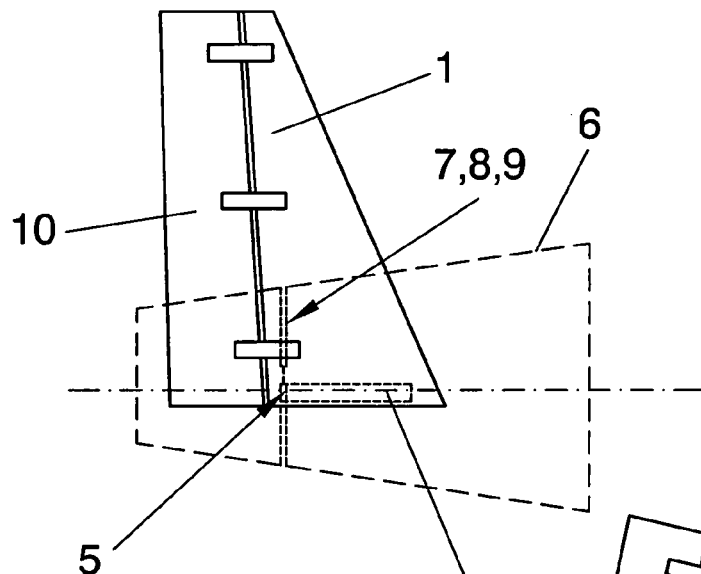
FIG. 3A is a schematic view of the tail of an aircraft containing an empennage provided with the rotary system of the present invention, in the cruise position.
Figure 3B:
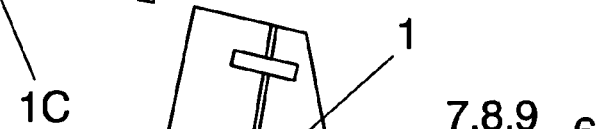
FIG. 3B shows the empennage of FIG. 3A with a negative maximum angle of incidence, corresponding to a position in an ascent manoeuvre of the aircraft.
Figure 3C:
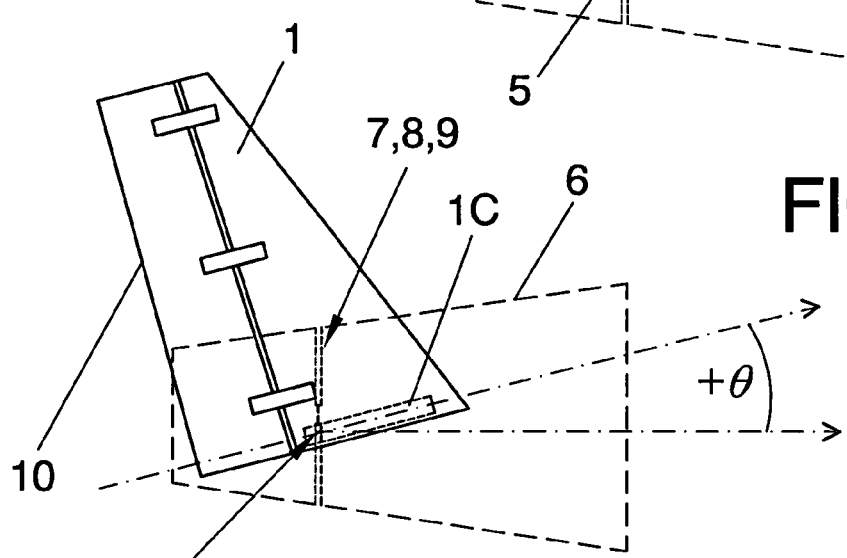
FIG. 3C shows the empennage of FIG. 3A with a positive maximum angle of incidence, corresponding to a position in a descent maneuver of the aircraft.

FIGS. 1 to 6 schematically illustrate an embodiment of the coupling of a large dihedral empennage 1 to the tail fuselage 6 of an aircraft.

The empennage includes a right lateral box 1a and a left lateral box 1b arranged in a dihedral angle, i.e. in forming the right lateral box and the left lateral box a dihedral angle is formed therebetween, in the tail fuselage 6 of the aircraft, with separate rudders 10 being coupled to these lateral boxes, along with a horizontal central box 1c which joins the lateral boxes 1a, 1b. Provided in the rear spar 11 of the central box 1a are means of linkage 2, 3, 4 by which the central box 1c is horizontally linked to a closed frame structure comprising a central frame 7, an upper frame 8 and a lower frame 9 (see FIG. 6), in the tail fuselage 6, in such a way that, as can be observed in FIGS. 3A, 3B and 3C, the empennage can rotate vertically on a horizontal linkage shaft 5 between a negative maximum angle of incidence $-\theta_1$ (corresponding to a position in an ascent manoeuvre of the aircraft) and a positive maximum angle of incidence $+\theta_2$ (corresponding to a position in a descent manoeuvre of the aircraft) in response to the actuation of actuator means (not represented in the figures) which are connected to the empennage 1 and to a structural element of the fuselage of the aircraft. It can therefore be observed that the large dihedral empennage to which the coupling system of the present invention is applied acts as an elevator.

The means of linkage comprise a first linked fitting 2 provided in the proximity of the right box 1a, a second linked fitting 3 provided in the proximity of the left box 1b, and also two lateral load linked fittings 4, 4' which prevent lateral displacements of the empennage 1 and which are arranged in the central box 1a between the linked rotary fittings 2, 3.

Figure 16:
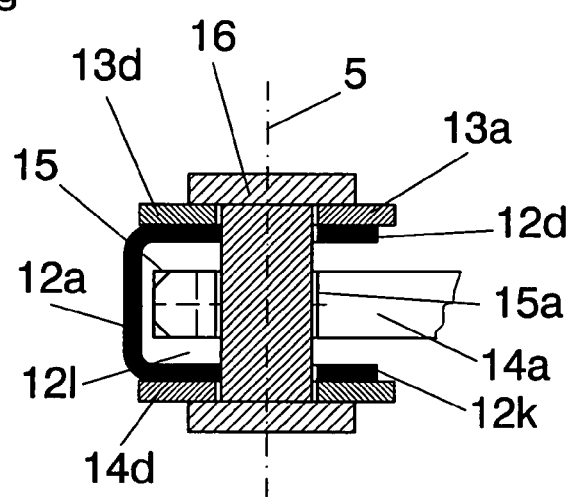
FIG. 16 is a schematic view in cross-section along the line D-D' appearing in FIG. 15.
Figure 17:
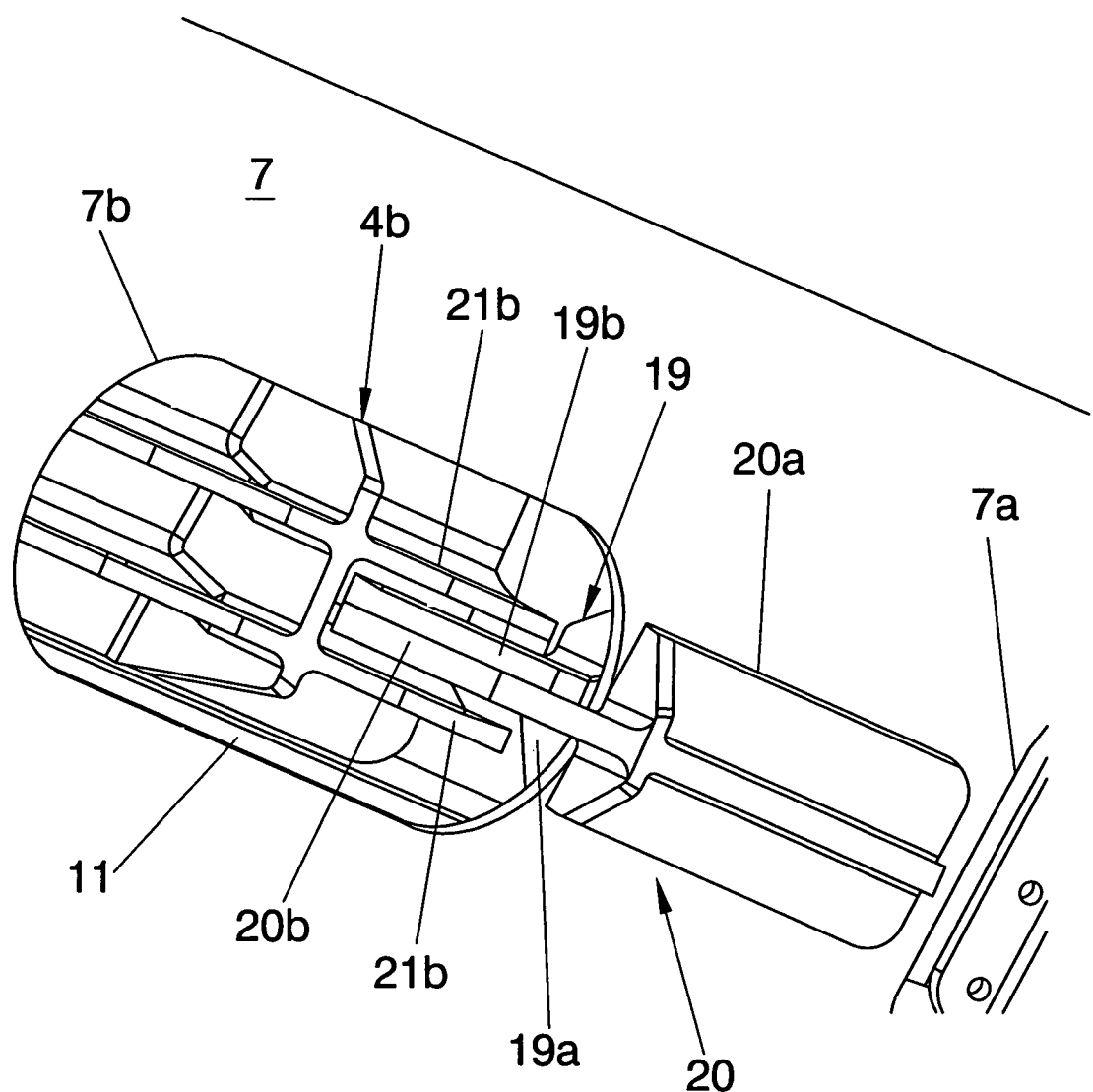
FIG. 17 is a schematic view in perspective of an embodiment of the lateral load linked fitting applicable in the system of the present invention where just one of the lateral load fittings is seen fitted in the central section of the frame for a better understanding.
Figure 18:
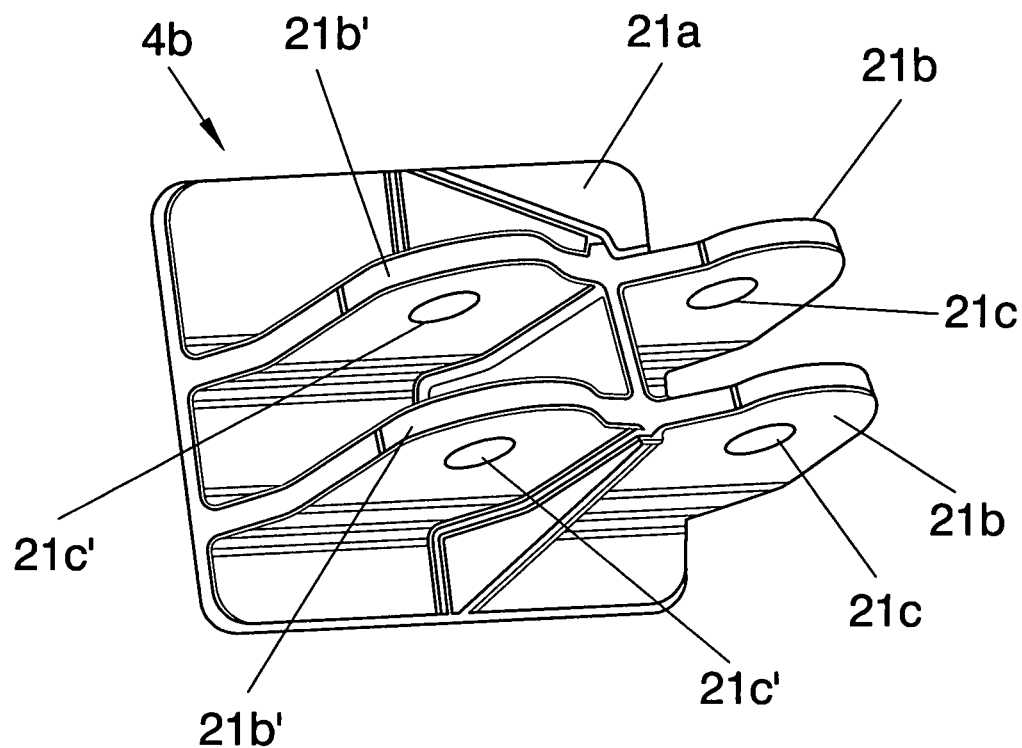
FIG. 18 is a more detailed schematic view in perspective of the lateral load fitting attached to the rear par of the central box of the empennage shown in FIG. 17.
Figure 19:
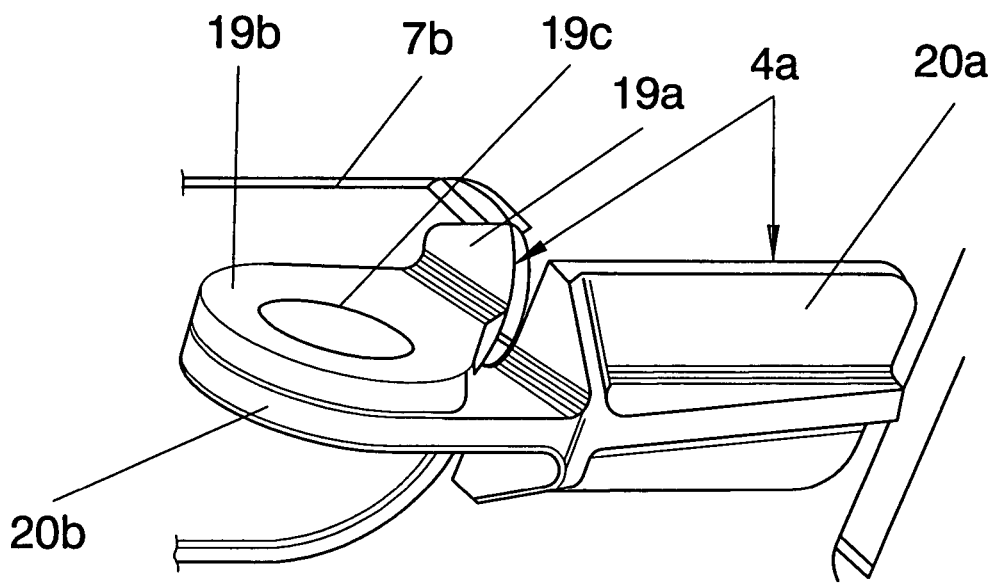
FIG. 19 is a more detailed schematic view in perspective of the lateral load counter-fitting shown in FIG. 17 attached to the central section of the frame.
Figure 20:
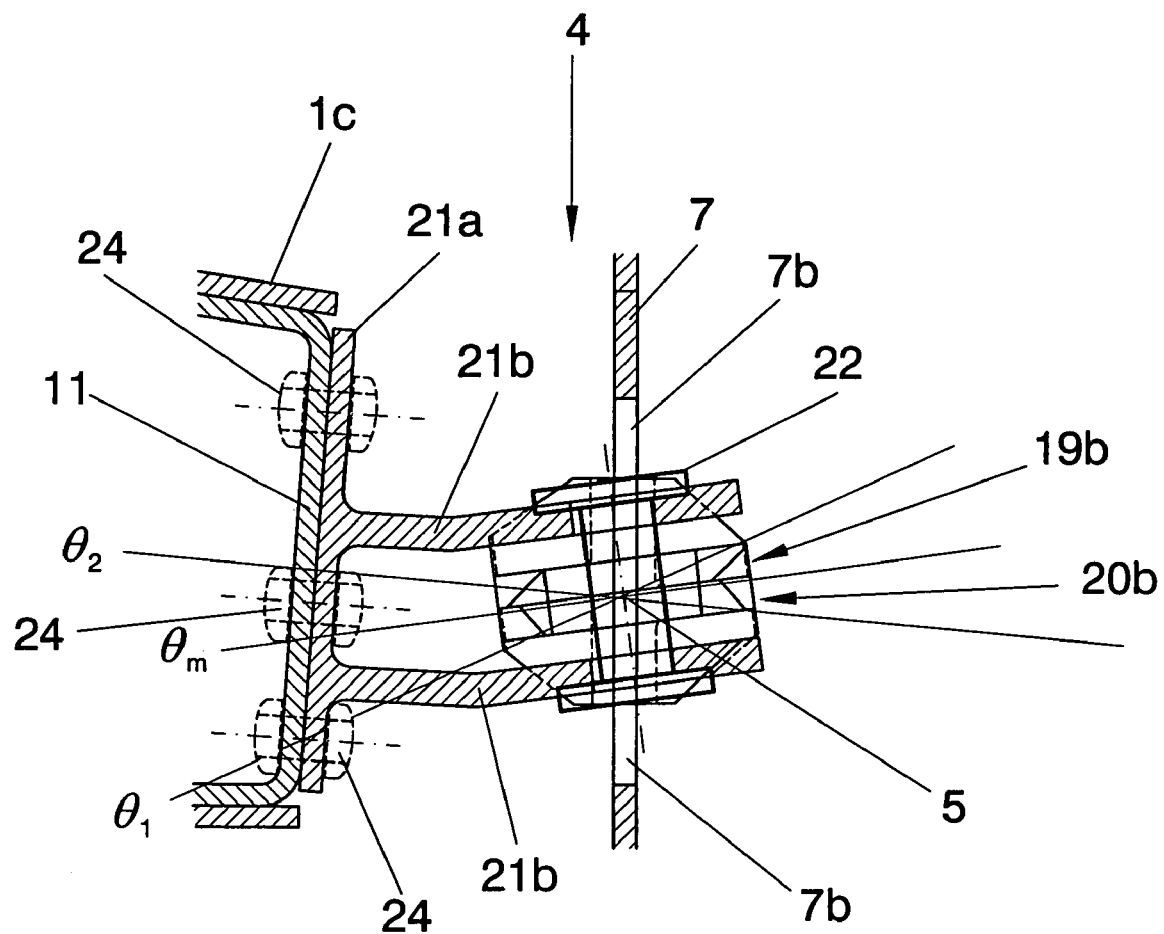
FIG. 20 is a schematic view in cross-section of the lateral load linked fitting shown in FIG. 17.
Figure 21:
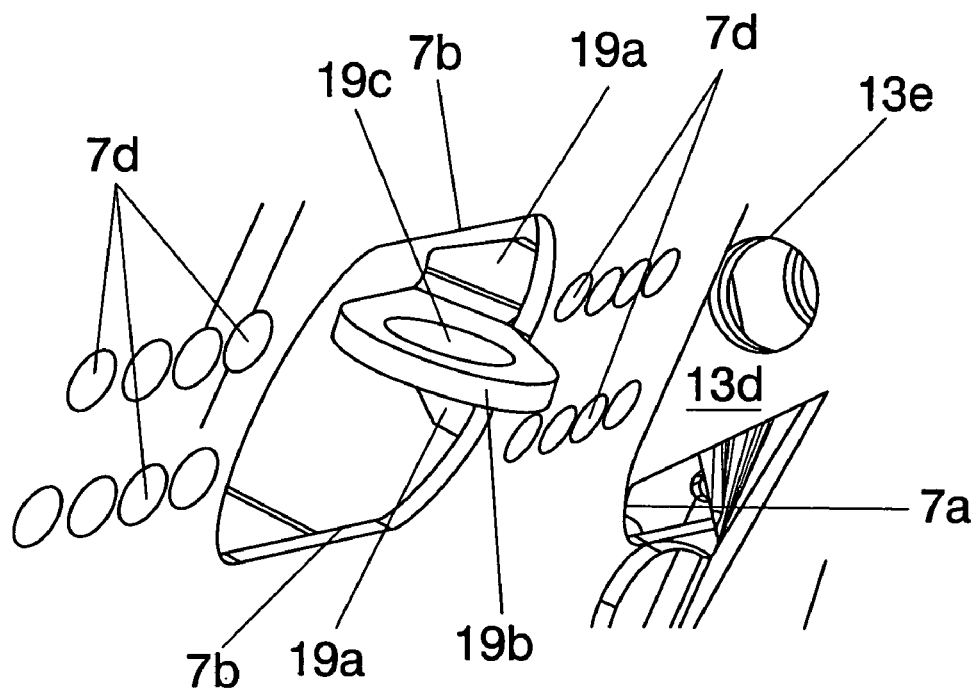
FIG. 21 is a schematic view in perspective showing the position of the forward fitting in the frame.
Figure 22:
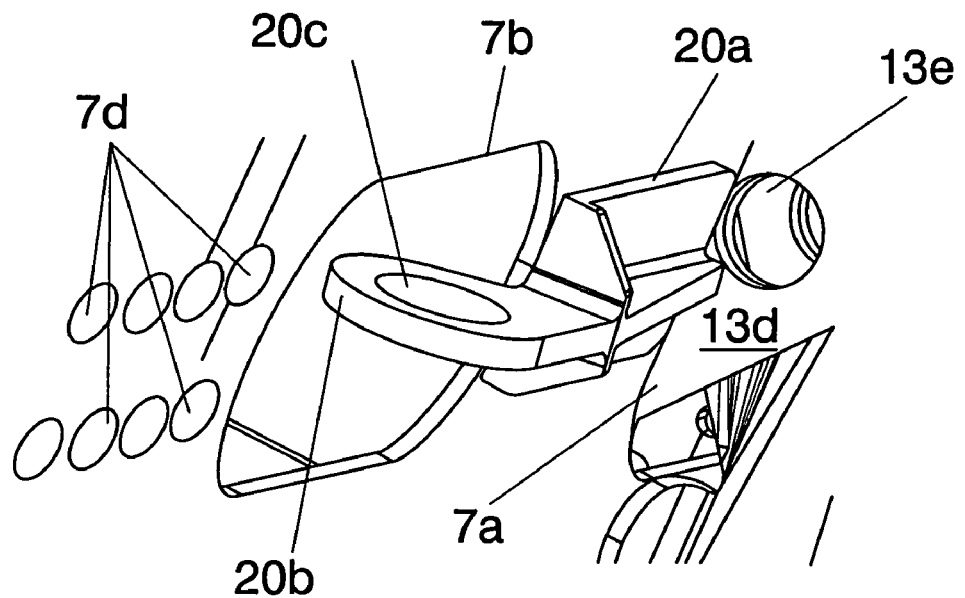
FIG. 22 is a schematic view in perspective showing the position of the rear fitting in the frame.
Figure 23:
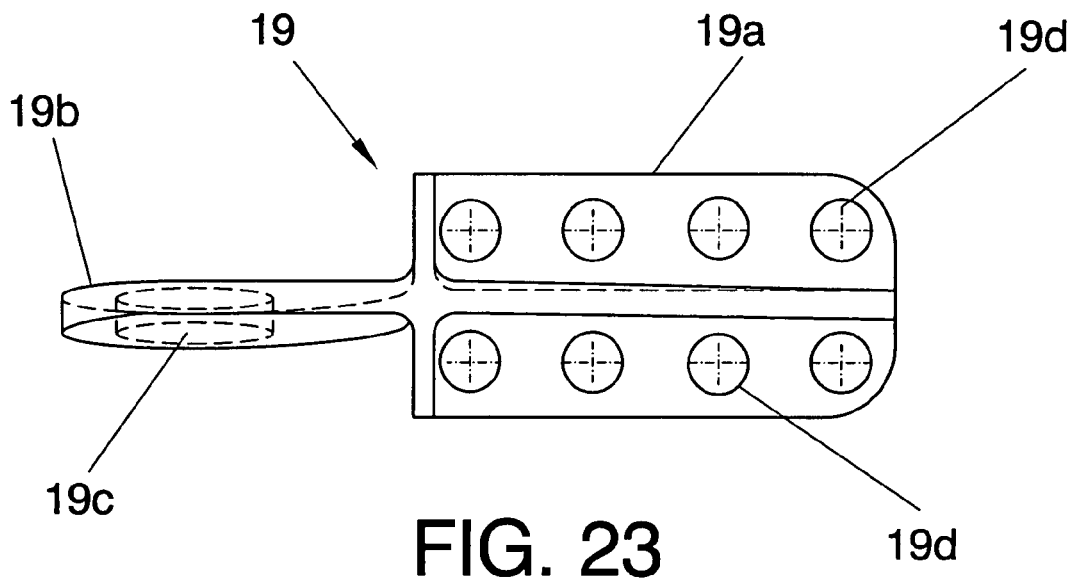
FIG. 23 is a schematic view in upper plan of the forward fitting appearing in FIG. 17.
Figure 24:
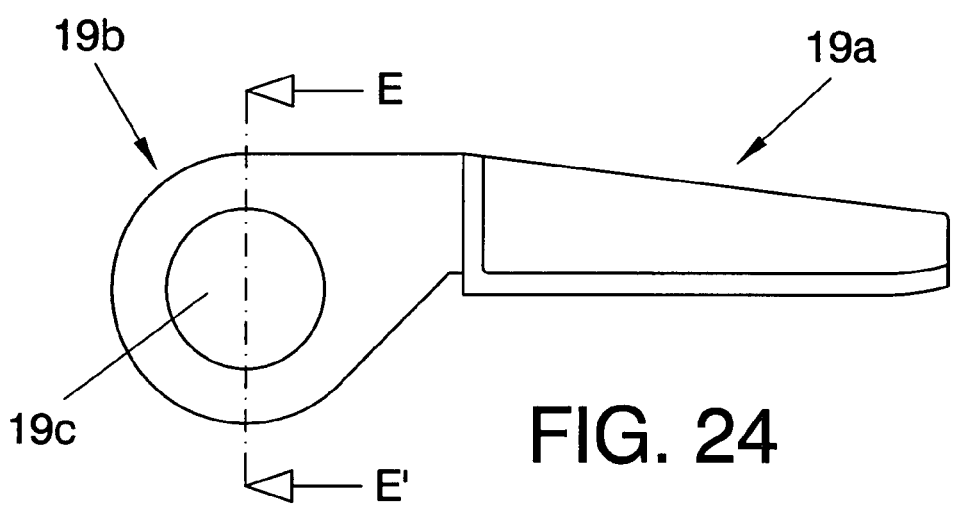
FIG. 24 is a lateral schematic view of the forward fitting appearing in FIG. 17.
Figure 25:
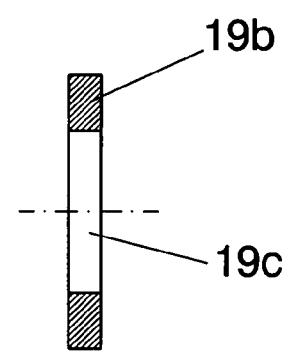
FIG. 25 is a schematic view in cross-section along the line E-E' appearing in FIG. 24.
Figure 26:
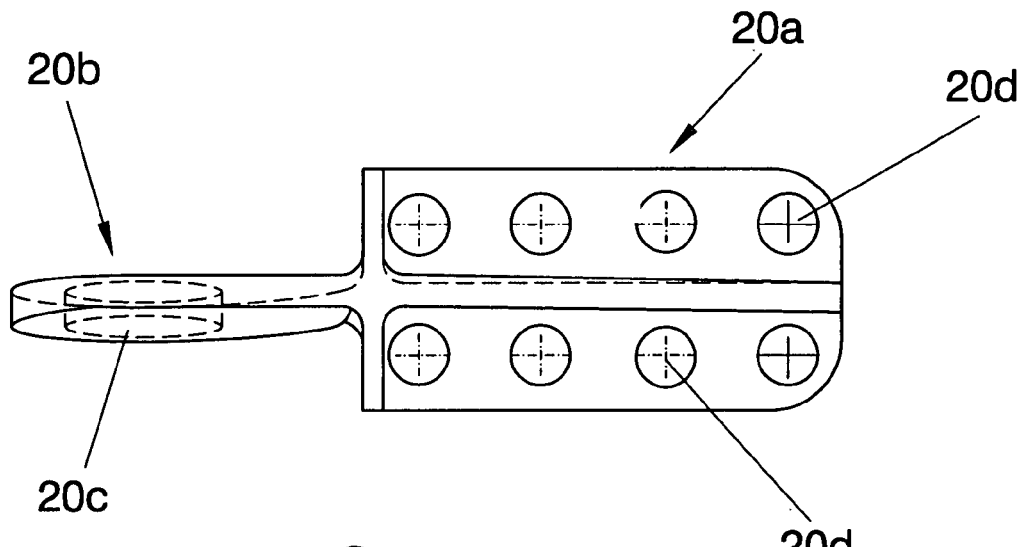
FIG. 26 is a schematic view in upper plan of the rear fitting appearing in FIG. 17.
Figure 27:
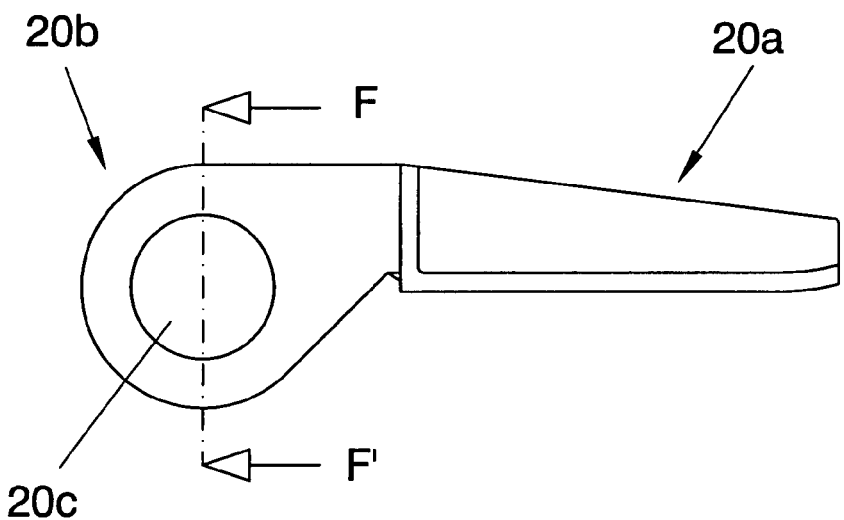
FIG. 27 is a lateral schematic view of the rear fitting appearing in FIG. 17.
Figure 28:
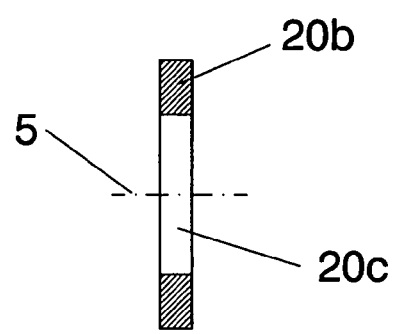
FIG. 28 is a schematic view in cross-section along the line F-F' appearing in FIG. 27.
Figure 29:
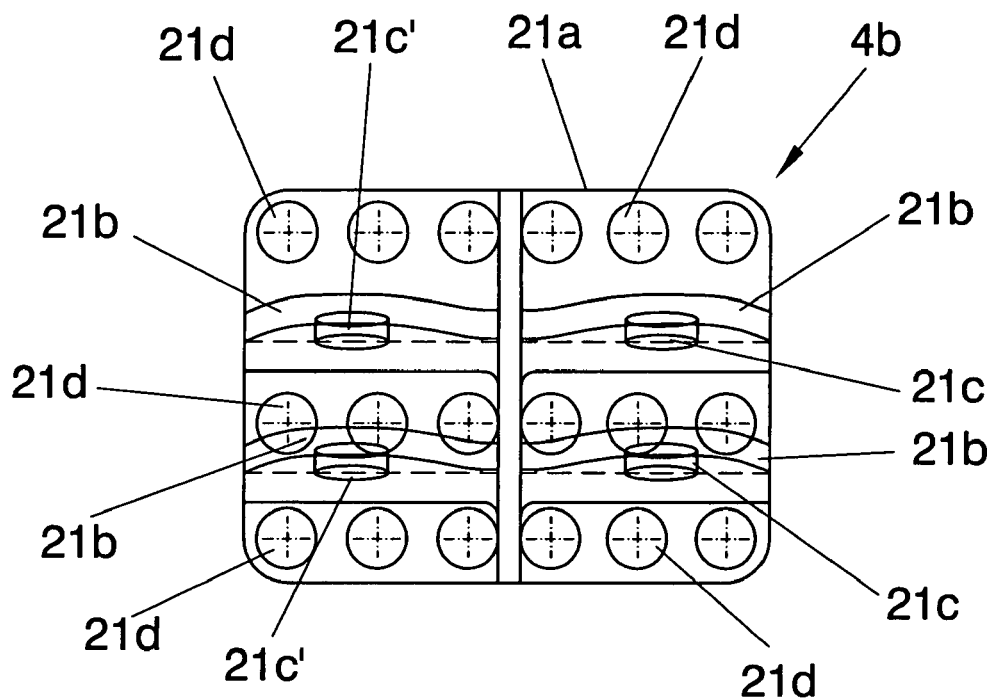
FIG. 29 is a schematic view in perspective showing the complementary lateral load fitting appearing in FIG. 19.
Figure 30:
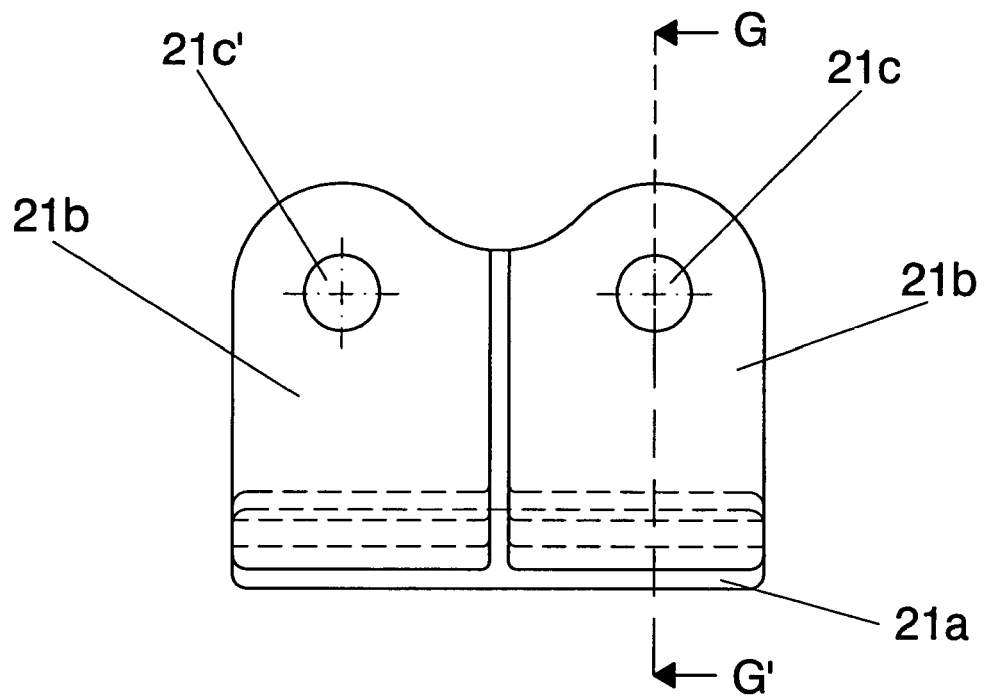
FIG. 30 is a schematic view in lower plan of the complementary lateral load fitting appearing in FIG. 19.
Figure 31:
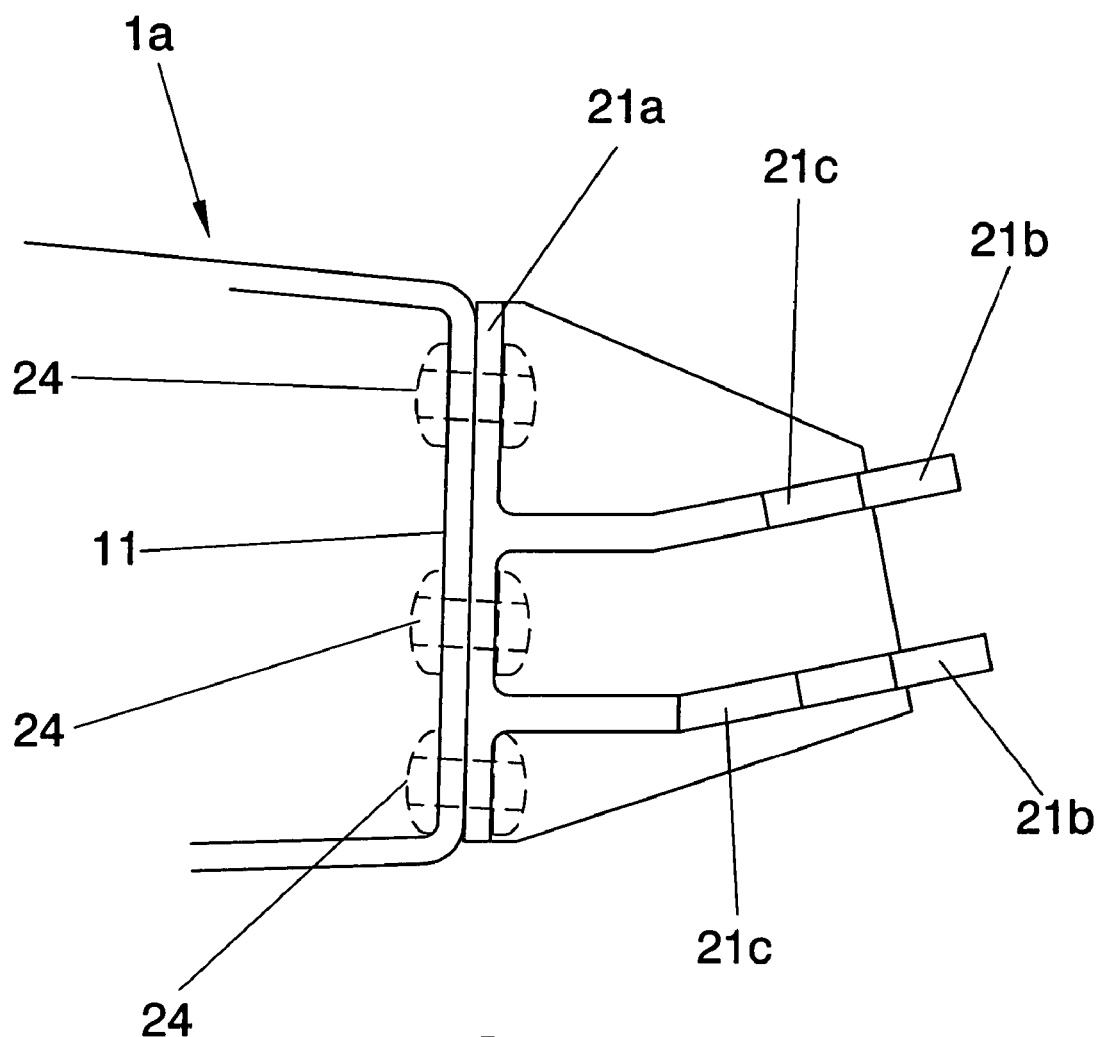
FIG. 31 is a schematic view in cross-section along the line G-G' of the of the complementary lateral load fitting appearing in FIG. 19, fitted in the central box of the empennage.

The first linked fitting 2 comprises a first rotary fitting 2a provided in the central section 7 of the closed frame 7, 8, 9 and is linked by means of a first bolt 16 (shown in FIG. 16) to a first complementary rotary fitting 15 provided in the rear spar 11 of the central box 1c of the empennage 1, while the second linked fitting comprises a second rotary fitting 3a provided in the central section 7 and is linked by means of a second bolt 16 to a second complementary rotary fitting 15 also provided in the rear spar 11 of the empennage 1.

Figure 4:
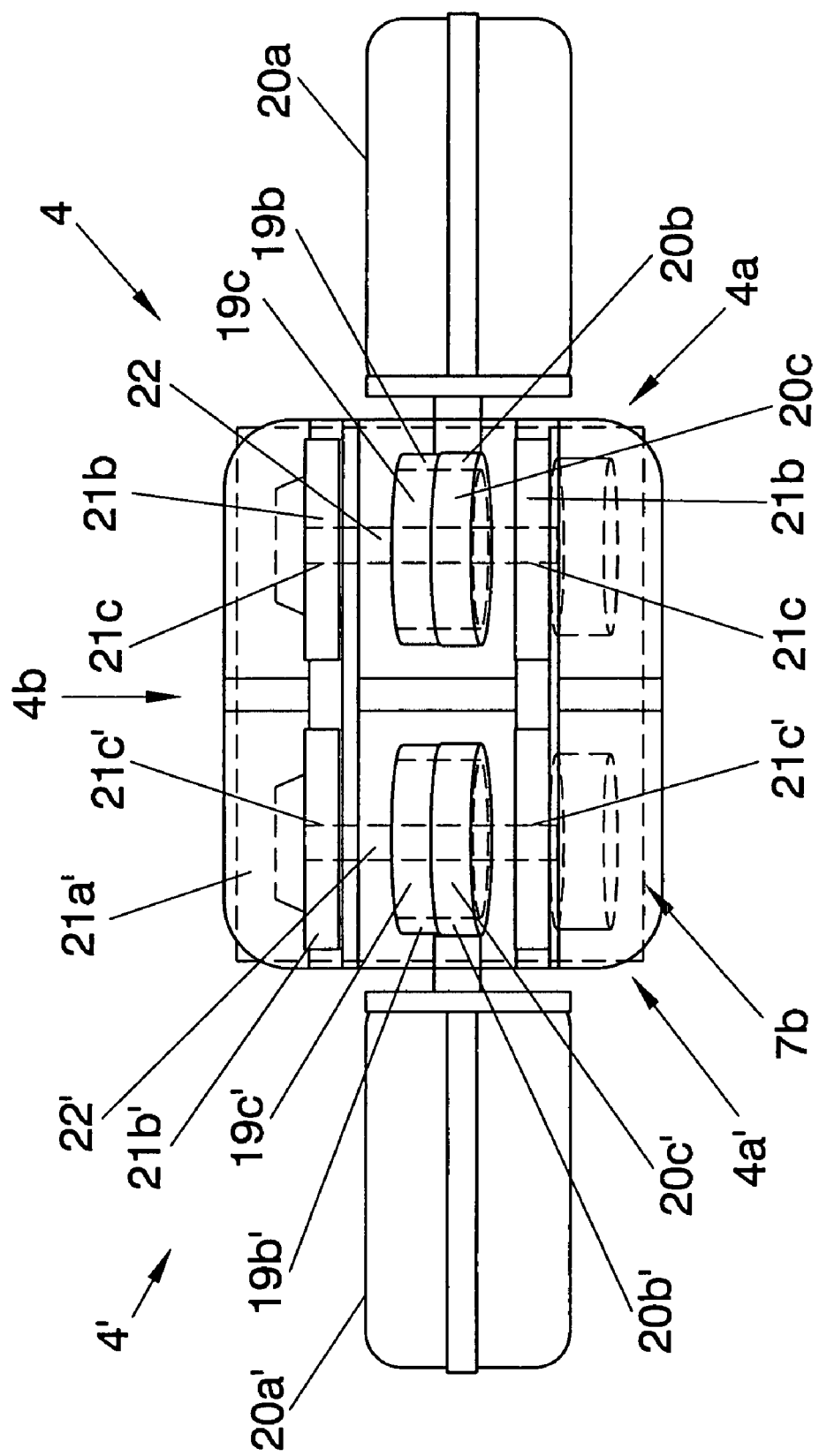
FIG. 4 is a front schematic view of an embodiment of a lateral load linked fitting which can be used in accordance with the present invention.
Figure 5:
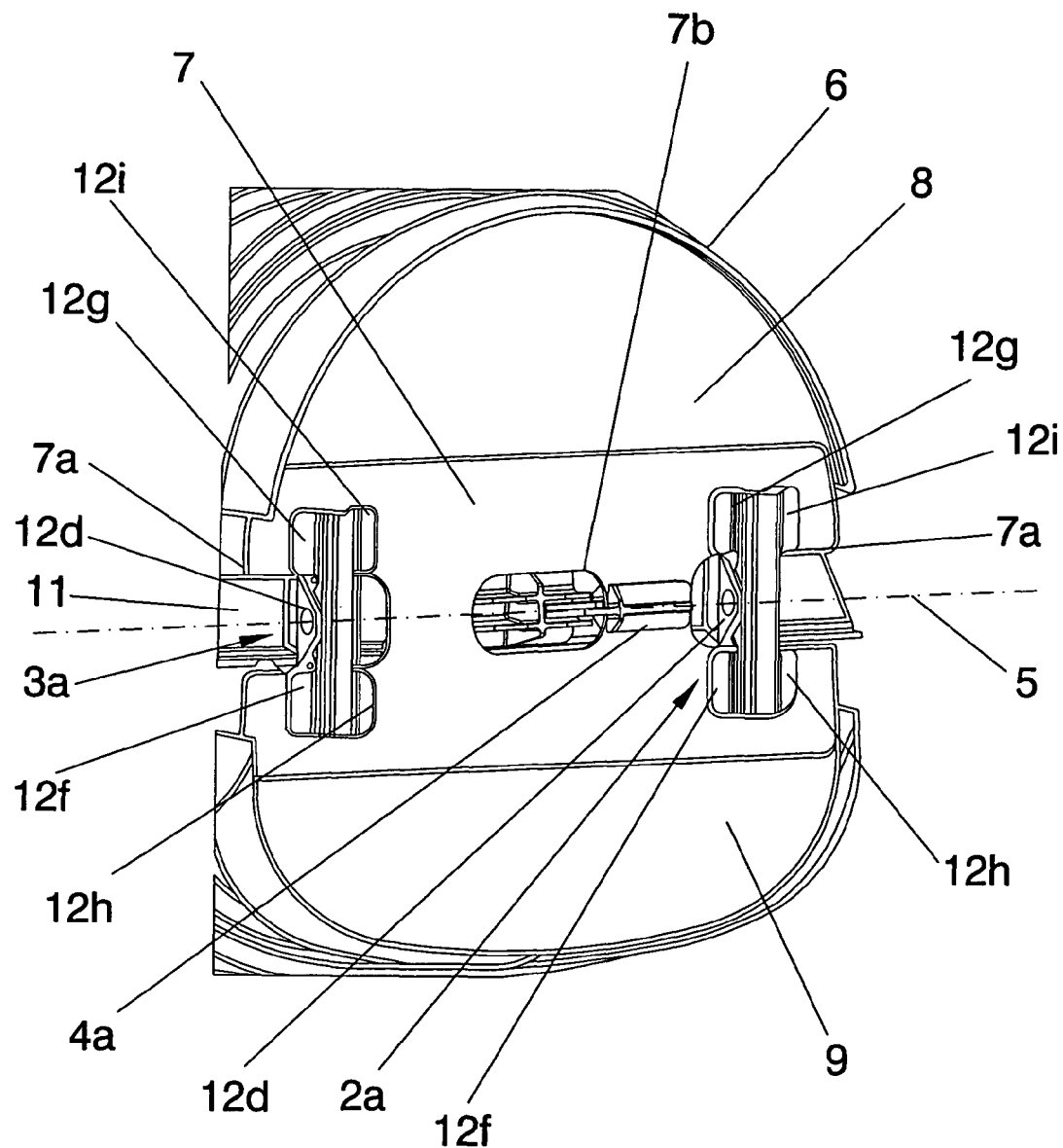
FIG. 5 is a schematic view in rear perspective of the tail fuselage of the aircraft to which the structure of the empennage shown in FIGS. 1 to 4 is linked.
Figure 12:
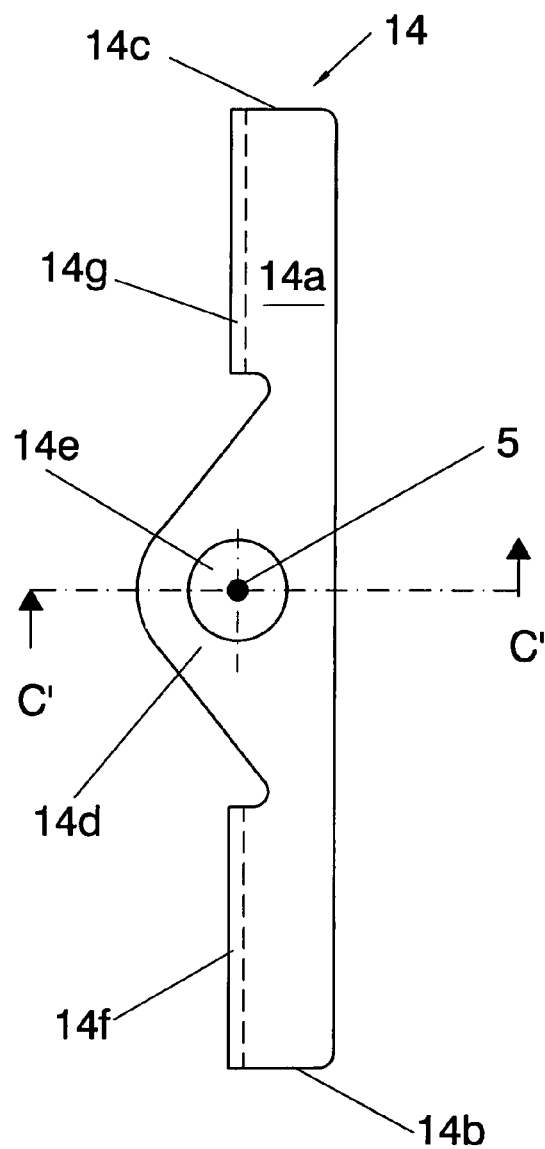
FIG. 12 is a schematic view in lateral elevation of an embodiment of the second lateral counter-fitting element used together with the central rotary fitting element shown in FIGS. 5 to 8.
Figure 13:
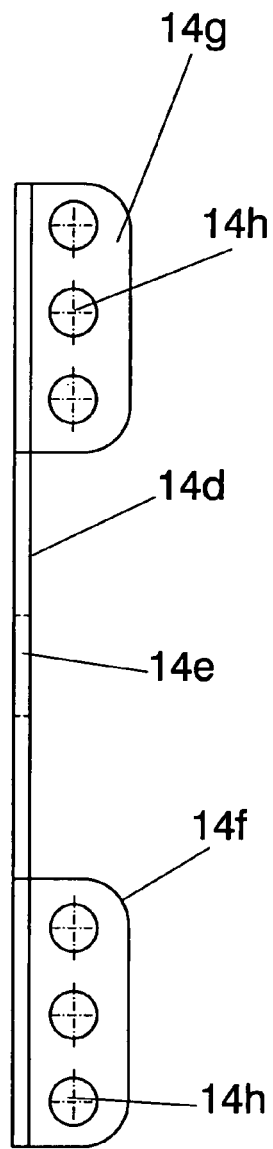
FIG. 13 is a schematic view in upper plan of the second counter-fitting element shown in FIG. 12.
Figure 14:
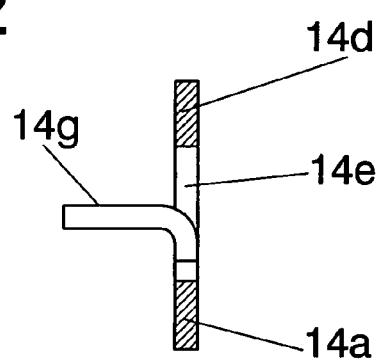
FIG. 14 is a schematic view in cross-section along the line C-C' (rotated 90° in the clockwise direction) appearing in FIG. 12.

In turn, each lateral load linked fitting 4, 4' comprises a lateral load fitting 4a, 4a' provided in the structure of the central frame 7, linked to a complementary lateral load fitting 4b provided in the rear spar 11 of the empennage 1. The lateral load fittings 4a, 4a', 4b are linked together in such a way that they permit the empennage 1 to rotate around the horizontal shaft 5. The two lateral load linked fittings 4a, 4a' are schematically illustrated in FIG. 4. These fittings are also present in the coupling system shown in FIG. 5, though, for greater clarity, the second fitting 4a' has been omitted from this latter figure.

FIGS. 6-8 show an embodiment of the rotary fittings 2, 3 in which each rotary fitting 2a, 3a comprises a central fitting element 12, a first counter-fitting element 13 and a second counter-fitting element 14.

In accordance with this invention, the central fitting element 12 is an elongated body comprising a first lateral wall 12n, a second lateral wall with a second lateral wall 12o, and also a central wall 12a which joins the lateral walls 12n, 12o in such a way that between the lateral walls 12n, 12o, an interior channel 12l is defined.

The first lateral wall 12n presents a free edge from which emerge a first lug 12d with a first opening 12e, a first lateral wing 12g arranged between the first end 12b of the central fitting element 12 and the first lug 12d, and a second lateral wing 12f arranged between the second end 12c of the central fitting element 12 and the first lug 12d. The second lateral wall 12o also has a free edge from which emerge a second lug 12k with a second opening 12j, a third lateral wing 12i arranged between the first end 12b of the central fitting element 12 and the second lug 12k, and a fourth lateral wing 12h arranged between the second end 12c of the central fitting element 12 and the second lug 12k. The lugs 12d, 12k are coplanar with the lateral wall 12n, 12o from which they respectively emerge, while the lateral wings 12f, 12g, 12h, 12i do so from the respective lateral walls 12n, 12o in the opposite direction to the central wall 12a.

The first counter-fitting element 13 comprises a first plate 13a with a first end 13b and a second end 13c between which an edge is defined from which extend a third lug 13d with a third opening 13e. The third lug 13d is coplanar with the first plate 13a. The counter-fitting furthermore comprises a fifth lateral wing 13g which emerges laterally from the said edge between the first end 13b and the third lug 13d, and a sixth lateral wing 13f which extends laterally from that edge between the second end 13c of the first plate 13a and the third lug 13d. The second counter-fitting element 14 comprises a second plate 14a with a first end 14b and a second end 14c between which an edge is defined from which extend a fourth lug 14d with a fourth opening 14e, said fourth lug 14d being coplanar with the second plate 14a and presents a fourth opening 14e. The second counter-fitting element furthermore comprises a seventh lateral wing 14g which emerges laterally from the edge of the second plate 14a between its first end 14b and the fourth lug 14d, and an eighth lateral wing 14f which extends laterally from its edge between the second end 14c of the second plate 14a and the fourth lug 14d.

Figure 15:
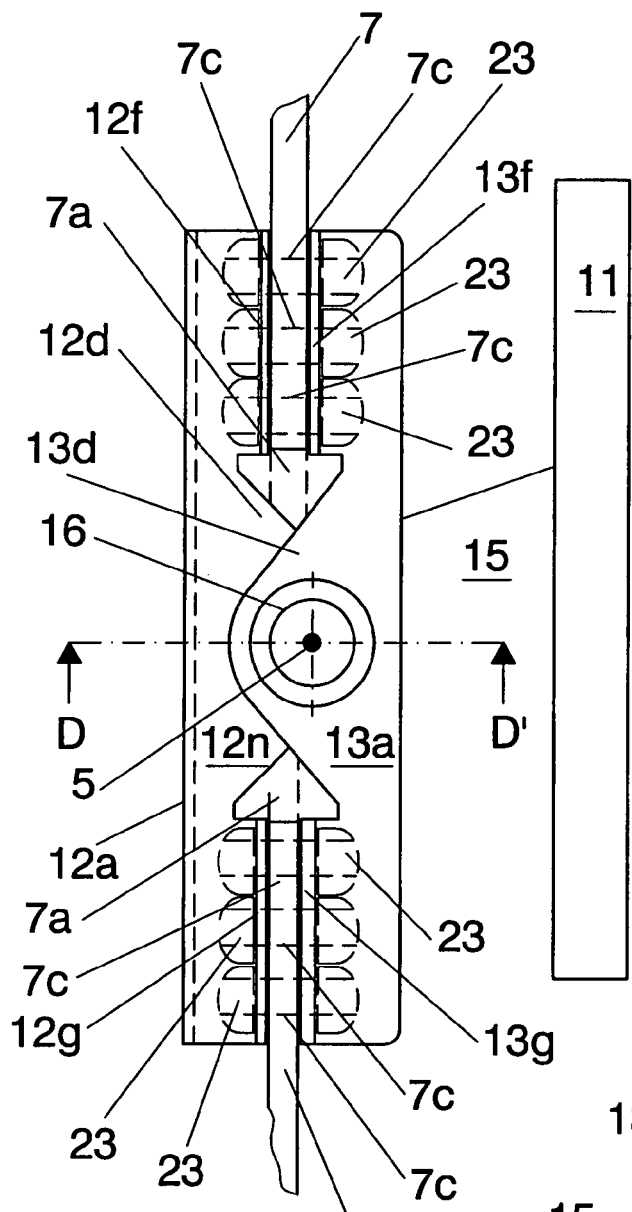
FIG. 15 is a lateral view of a rotary fitting composed of the central fitting elements and the lateral counter-fitting shown in FIGS. 6-14.

The lateral wings 12f, 12g, 12h g, 12i of the central fitting element 12 and the lateral wings 13f, 13g, 14f, 14g of the counter-fitting elements 13, 14 are arranged in positions so that they are respectively facing each other and separated by a distance corresponding to the thickness of the central section 7 of the frame, in such a way that the openings 12m found in the lateral wings 12f, 12g, 12h g, 12i of the central fitting element 12 are in correspondence respectively with the drill-holes 13h made in the lateral wings 13f, 13g of the first counter-fitting element 13 and the drill-holes 14h in the lateral wings 14f, 14g. Said holes and drill-holes are in turn positioned in such a way together with the passage holes 7c that they respectively form spaces for fastening pins 23 (see FIG. 15) which permit the central fitting element 12 to be fastened to the counter-fitting elements 13, 14 so that the part of the central section 7 of the frame that lies between the respectively facing lateral wings of the central fitting element 12 and of the counter-fitting elements 13, 14 remains trapped between them.

The first lug 12d of the central fitting element 12 makes contact with at least the outer surface of the third lug 13d of the first counter-fitting element 13, and the second lug 12k in the central fitting element 12 makes contact with at least the outer surface of the fourth lug 14d in the second counter-fitting element 14. In this way the openings 12e, 12j, 13e, 14e are aligned with each other and with the opening 15a for permitting the bolt 16 to be housed.

The central fitting element 12 is arranged in a first side of the central section 7 of the closed frame 7, 8, 9 while the counter-fitting elements 13, 14 are arranged in a second side of the closed frame 7, 8, 9. In order to allow the assembly of these fitting elements 12, 13, 14, the central section 7 presents individual cut-outs 7a, via which extend the lugs 13d, 14d of each counter-fitting element 13, 14. In the embodiment shown, the first lug 12d makes contact with the surface of the first plate 13a, and the second lug 12k makes contact with the surface of the second plate 14a, while the third lug 13d also makes contact with the outer surface of the first lateral wall 12n and the fourth lug 14k also makes contact with the outer surface of the second lateral wall 12o.

FIGS. 4 and 17 to 31 show aspects of an embodiment of lateral load linked fitting 4 mounted in the central section 7 of the closed frame, in which each lateral load fitting 4a, 4a' and the complementary lateral load fitting 4b are coupled together by a swivel coupling. Although FIGS. 17 to 31 show just one lateral load fitting 4a and its various elements, this second lateral load fitting 4a' and its elements are entirely analogous to the fitting 4a, and the arrangement of the second lateral load fitting 4a' can be appreciated in FIG. 4.

In the embodiment illustrated in FIGS. 17 to 31, the lateral load fitting 4a (and therefore also the second lateral load fitting) comprise a forward fitting 19 and a rear fitting 20.

The forward fitting 19 comprises a first part 19a fixed to a first side of the central section 7, and a first free lug 19b with a first passage hole 19c. In turn, the rear fitting 20 comprises a first part 20a fixed to a second side of the central section 7 opposite to the first side and a second free lug 20b with a second passage hole 20c. The first free lug 19b of the forward fitting 19 and the second free lug 20b of the rear fitting 20 are in contact with each other and emerge via the additional cut-out 7b in the central section 7 in such a way that the passage holes 19c, 20c of these lugs 19b, 20b are aligned with each other.

The complementary lateral load fitting 4b comprises a plate 21a joined to the rear spar 11 of the central box 1c of the empennage 1, and two wings 21b emerging orthogonally at different heights of the plate 21a, separated from each other and provided with a pair of mouths 21c, 21c'. The mouths 21c, 21c' are in positions such that the mouths 21c of one side of the complementary lateral load fitting 4b are aligned with the passage holes 19c, 20c of the first lateral load fitting 4a when the lugs 19b, 20b of the lateral load fitting 4a are positioned between the wings 21b, in such a way that the mouths 21c and passage holes 19c, 20c thereby form a first vertical space for housing a first pin 22. In turn, the mouths 21c' of the other side of the complementary lateral load fitting 4b are aligned with the passage holes 19c', 20c' of the second lateral load fitting 4a' when the lugs 19b', 20b' of the second lateral load fitting 4a' are positioned between the wings 21b, in such a way that the mouths 21c' and passage holes 19c', 20c' form a second vertical space for housing a second pin 22'. The array thus formed can be seen in particular in FIG. 4.

The complementary lateral load fitting 4b is fixed to the rear spar 11 of the central box 1c by means of fastening pins 24 which penetrate via drill-holes 21d made in the rear plate 21 of the complementary lateral load fitting 4b and via complementary holes (not shown in the figures) made in the wall of said rear spar 11.

The distance between the wings 21b is greater than the thickness of the free lugs 19b, 20b of the lateral load fitting 4a and the passage holes 19c, 20c have, at least in the axial direction, extensions greater than the diameter of the pin 22, in such a way that said lateral load fittings have a swivel fitted in their housings which permits the rotation of certain fittings with respect to others. Specifically, the distance between the wings 21b, the extensions of the passage holes 19c, 20c and the dimensions of the free lugs 19b, 20b are designed in such a way that the wings 21b and the free lugs 19b, 20b do not make contact when the empennage 1 rotates between the negative maximum angle of incidence $-\theta_1$ and the positive maximum angle of incidence $+\theta_2$ and they remain positioned in parallel planes for a mean angle of incidence $\theta_m$ corresponding to half the angle of rotation between said negative maximum angle of incidence $-\theta_1$ and said positive maximum angle of incidence $+\theta_2$.

Each of the forward fittings 19, 19' is fastened to its corresponding rear fitting 20, 20' by means of fastening bolts (not shown in the figures) which traverse drill-holes 7d in the central section of the frame and the facing drill-holes 19d, 20d, 19d', 20d' respectively provided in the front fittings 19, 19' and rear fittings 20, 20', in such a way that part of the central section 7 of the frame that lies between those fitting 19-20, 19'-20' remains trapped between them.

The lateral load fitting 4a, 4a', the complementary lateral load fitting 4b, the central fitting elements 12 and the counter-fitting elements 13, 14 that are shown in the figures can all be manufactured from with carbon fibre reinforced resin.

The invention claimed is:

1. A pivoting coupling system of a large dihedral empennage for coupling the empennage to a tail fuselage of an aircraft, the empennage including a right lateral box and a left lateral box forming a large dihedral angle in the tail fuselage of the aircraft, said pivoting coupling system comprising:
   a horizontal central box joining the lateral boxes, and including a rear spar; and
   a plurality of linked rotary fittings for horizontally linking the central box to a frame structure of the tail fuselage of the aircraft, said plurality of linked rotary fittings enabling the empennage to rotate vertically about a horizontal linkage shaft between a negative maximum angle of incidence and a positive maximum angle of incidence in response to actuation of an actuator means connected to the fuselage and to a structural element of the fuselage of the aircraft;

wherein the frame structure comprises a closed frame, and said plurality of linked rotary fittings comprises a first linked fitting provided in the proximity of the right box, said first linked fitting comprising a first rotary fitting provided in the frame structure and linked by a first bolt to a complementary first rotary fitting provided in said rear spar of the empennage, a second linked fitting provided in the proximity of the left box, said second linked fitting comprising a second rotary fitting provided in the frame structure linked by a second bolt to a complementary second rotary fitting provided in said rear spar of the empennage, and each rotary fitting of said complementary first and second rotary fittings in turn comprising at least one complementary opening aligned with at least one opening in one of the first and second rotary fittings in order to form a space in which the bolt is housed;

a lateral load linked fitting in order to prevent lateral displacements of the empennage, which is provided in the central box between said first and second linked fittings and which comprises two lateral load fittings provided in the frame structure linked to at least one complementary lateral load fitting which is provided in said rear spar of the empennage, the lateral load fittings being linked together such that they permit the empennage to rotate on the horizontal shaft.

2. A rotary system according to claim 1, wherein
each of said first and second rotary fittings comprises
a first fitting element with at least one lower anchoring point and at least one upper anchoring point and at least two lugs between said anchoring points, each lug being traversed by an opening.

3. A rotary system according to claim 1, wherein
each of said first and second rotary fitting comprises a central fitting element, a first counter-fitting element and a second counter-fitting element;
said central fitting element is an elongated body which comprises
a first end and a second end,
a first lateral wall with a free edge from which emerges a first lug with a first opening, a first lateral wing being arranged between said first end of said central fitting element and said first lug, and a second lateral wing being arranged between said second end of said central fitting element and said first lug,
a second lateral wall with a free edge from which emerges a second lug with a second opening, a third lateral wing being arranged between said first end of said central fitting element and said second lug, and a fourth lateral wing being arranged between said second end of said central fitting element and said second lug,
a central wall joining said first and second lateral walls,
each of said first and second lugs being coplanar with the first and second lateral walls, respectively, and each of said lateral wings extending from a respective lateral wall in the opposite direction to said central wall;
the first counter-fitting element comprises a first plate with a first end and a second end between which an edge is defined from which extends a third lug with a third opening coplanar with said first plate, a fifth lateral wing laterally emerging from said edge between said first end and said third lug, and a sixth lateral wing laterally emerging from said edge between said second end of said first plate and said third lug;
said second counter-fitting element comprises a second plate with a first end and a second end, between which an edge is defined from which extends a fourth lug with a fourth opening coplanar with said second plate with a fourth opening, a seventh lateral wing laterally emerging from said edge between said first end and the fourth lug, and an eighth lateral wing laterally emerging from said edge between said second end of said second plate and said fourth lug;

said lateral wings of said central fitting element and said lateral wings of said counter-fitting elements are arranged in positions so as to face each other and to be separated by a distance corresponding to the thickness of the frame structure, said first lug of said central fitting element makes contact with at least the outer surface of said third lug of said first counter-fitting element, and said second lug in said central fitting element makes contact with at least the outer surface of said fourth lug in said second counter-fitting element, in such a way that said openings are aligned with each other and with said opening for housing the bolt, said central fitting element is arranged on a first side of the frame structure and said counter-fitting elements are arranged on a second side of the frame structure; and the frame structure comprises cut-outs with which said lugs of each counter-fitting element extend.

4. A rotary system according to claim 3, wherein said first lug makes contact with the surface of said first plate and said second lug makes contact with the surface of said second plate.

5. A rotary system according to claim 3, wherein said third lug makes contact with the outer surface of said first lateral wall and said fourth lug makes contact with the outer surface of said second lateral wall.

6. A rotary system according to claim 3, wherein said central fitting element is made of carbon fiber reinforced resin.

7. A rotary system according to claim 3, wherein said first lug is joined to at least the outer surface of said third lug and said second lug is joined to at least the outer surface of said fourth lug.

8. A rotary system according to claim 3, wherein said counter-fitting elements are made of carbon fiber reinforced resin.

9. A rotary system according to claim 3, wherein
the frame structure furthermore comprises an additional cut-out;
each lateral load fitting and said complementary lateral load fitting are coupled to each other by a swivel joint.

10. A rotary system according to claim 3, wherein
each lateral load fitting comprises a forward fitting and a rear fitting,
said forward fitting comprises a first part fixed to a first side of the frame structure and a first free lug with a first passage hole,
said rear fitting comprises a first part fixed to a second side of the frame structure opposite to said first side and a second free lug with a second passage hole;
said first free lug of said forward fitting and said second free lug of said rear fitting are in contact with each other and emerge via said additional cut-out in such a way that said passage holes are aligned with each other;
said complementary lateral load fitting comprises a plate joined to said rear spar of said central box of the empennage, and at least two wings emerging orthogonally from said plate, separated from each other and provided with vertically aligned mouths,
the mouths in said wings are aligned with said passage holes when said lugs of said lateral load fitting are positioned between said wings, said mouths and said passage holes thereby forming a vertical space for housing a pin;

the distance between said wings is greater than the thickness of said free lugs of said lateral load fitting and said passage holes have, at least in the axial direction, extensions greater than the diameter of said pin, in such a way that said lateral load fittings can operate as a swivel.

11. A rotary system according to claim 1, wherein the closed frame furthermore comprises an additional cut-out;

each lateral load fitting and said complementary lateral load fitting are coupled to each other by a swivel joint.

12. A rotary system according to claim 11, wherein the lateral load fitting is made of carbon fiber reinforced resin.

13. A rotary system according to claim 11, wherein said complementary lateral load fitting is made of carbon fiber reinforced resin.

14. A rotary system according to claim 1, wherein each lateral load fitting comprises a forward fitting and a rear fitting, said forward fitting comprises a first part fixed to a first side of the frame structure and a first free lug with a first passage hole, said rear fitting comprises a first part fixed to a second side of the frame structure opposite to said first side and a second free lug with a second passage hole;

said first free lug of said forward fitting and said second free lug of said rear fitting are in contact with each other and emerge via said additional cut-out in such a way that said passage holes are aligned with each other;

said complementary lateral load fitting comprises a plate joined to said rear spar of said central box of the empennage, and at least two wings emerging orthogonally from said plate, separated from each other and provided with vertically aligned mouths, said mouths in said wings are aligned with said passage holes when said lugs of said lateral load fitting are positioned between the wings, said mouths and said passage holes thereby forming a vertical space for housing a pin;

the distance between said wings is greater than the thickness of said free lugs of said lateral load fitting and said passage holes have, at least in the axial direction, extensions greater than the diameter of said pin, in such a way that said lateral load fittings can operate as a swivel.

15. A rotary system according to claim 14, wherein said distance between said wings, said extensions of the passage holes and said free lugs are designed such that said wings and said free lugs do not make contact when the empennage rotates between the negative maximum angle of incidence and the positive maximum angle of incidence, and remain positioned in parallel planes for a mean angle of incidence corresponding to half the angle of rotation between the negative maximum angle of incidence and the positive maximum angle of incidence.

16. A rotary system according to claim 14, wherein the lateral load fitting is made of carbon fiber reinforced resin.

17. A rotary system according to claim 14, wherein the complementary lateral load fitting is made of carbon fiber reinforced resin.

* * * * *